United States Patent Office 3,465,023
Patented Sept. 2, 1969

3,465,023
PREPARATION OF NONAROMATIC POLYISOCYANATES
Marwan R. Kamal, Minneapolis, Minn., assignor to General Mills, Inc., a corporation of Delaware
No Drawing. Filed Dec. 7, 1965, Ser. No. 512,597
Int. Cl. C07c *119/04*
U.S. Cl. 260—453       4 Claims

ABSTRACT OF THE DISCLOSURE

Nonaromatic polyisocyanates of high purity are obtained by treating the crude product of the reaction of phosgene and the starting polyamine or halide salt thereof in an inert, water-immiscible solvent with an aqueous solution of a water soluble weak base. Substantially complete removal of hydrogen chloride from the reaction mixture and substantially complete conversion of carbamyl chloride to the corresponding polyisocyanate is obtained.

---

The present invention relates to an improved process for preparing certain polyisocyanates. More particularly, it relates to an improved method of preparing non-aromatic polyisocyanates from the corresponding polyamines or salts thereof via the reaction of these polyamines or salts with phosgene.

It is known to prepare polyisocyanates from the corresponding polyamines or salts thereof. One method of accomplishing this is by dissolving the amine or salt in an inert solvent and then adding phosgene to the solution to form the carbamyl chloride. The carbamyl chloride is converted to the corresponding isocyanate by application of heat. These reactions can be illustrated as follows:

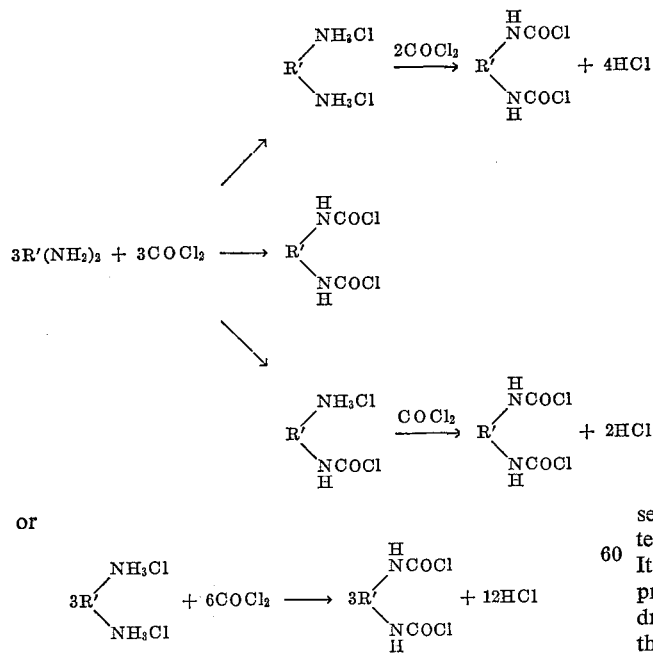

or

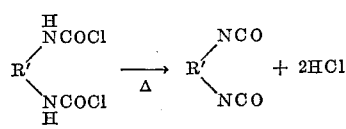

The carbamyl chloride is converted to the isocyanate as follows:

The complete conversion of the carbamyl chloride to the corresponding isocyanate is essential since the presence of the unconverted material reduces the yield of the final product and also results in the formation of hydrogen chloride which is undesirable because it slows down the reactivity of the isocyanates. Thus, it is also important to remove the hydrogen chloride formed in the described process. Another disadvantage resulting from the presence of either the carbamyl chloride or hydrogen chloride or both is the difficulty encountered in the distillation of the isocyanate product. The presence of hydrogen chloride presents problems in such distillations by causing difficulty in maintaining good vacuum conditions. In addition, the hydrogen chloride may be corrosive to the distillation equipment.

It has been proposed to effect the removal of hydrogen chloride formed during the reaction: by passing an excess of phosgene through the reaction mixture so that the unchanged phosgene entrains the hydrogen chloride on leaving the reaction mixture; by passing an inert gas such as nitrogen, carbon dioxide, air or hydrogen through the reaction mixture (alone or in combination with excess phosgene), the inert gases leaving the reaction mixture likewise entraining the hydrogen chloride; and by working in the presence of such solvents or diluents which dissolve hydrogen chloride only with difficulty or not at all, e.g. such as chlorobenzene, dichlorobenzene, toluene or xylene. While these procedures do aid in the removal of hydrogen chloride, they do not shift the equilibrium of the reaction sufficiently to prevent some carbamyl chloride from being found in the product during the distillation step. The same gives off hydrogen chloride during the distillation step with the problems mentioned above still being present. In addition, the use of excess phosgene increases the cost of the process and/or presents further difficulties because of the problems encountered in handling such excess of this noxious reactant. It would be highly desirable to provide a process for preparing non-aromatic polyisocyanates wherein the hydrogen chloride is substantially completely removed and the carbamyl chloride is substantially completely converted to the polyisocyanate prior to the distillation step.

It is, therefore, an object of the present invention to provide an improved process for preparing non-aromatic polyisocyanates.

Another object is to provide such a method where substantially complete removal of hydrogen halide is readily and easily effected.

Still another object is to provide such a method where high yields of polyisocyanate are obtained and substantially complete conversion of the carbamyl chloride intermediate to the corresponding polyisocyanate is readily and easily effected.

These and other objects will become apparent from the following detailed description.

I have now discovered that high yields of non-aromatic polyisocyanates of high purity can be obtained if the crude product of the reaction of phosgene with the polyamine or halide salt thereof in an inert, water-immiscible solvent is washed one or more times with an aqueous solution of a weakly basic reagent. Substantially complete removal of any hydrogen halide from the polyisocyanate is effected and the described washing step also speeds up the decomposition or conversion of the carbamyl chloride to the polyisocyanate while at the same time removing the hydrogen halide released by such conversion.

The process of the present invention is useful in the preparation of nonaromatic polyisocyanates, particularly diisocyanates, which are not miscible to any significant extent with water. Such polyisocyanates generally contain from about 16 to 75 carbon atoms in the moiety to which the NCO groups are attached. The process is particularly useful in preparing polyisocyanates derived from polymeric fat acids. Such polyisocyanates have the idealized, structural formula:

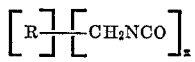

where $x$ is an integer of 2 to about 4 and R is the hydrocarbon group of polymeric fat acids. Preferably $x$ is 2.

The starting materials for preparing the polyisocyanates are the corresponding polyamines or salts thereof. Thus the starting materials for preparing the preferred polyisocyanates according to my process are the corresponding polyamines or salts thereof derived from polymeric fat acids. The polymeric fat acids are first converted to the corresponding polynitriles and the latter compounds are hydrogenated in the process of ammonia and a catalyst such as Raney nickel to form the polyamines. This can be illustrated as follows (using a dimeric fat acid as an example):

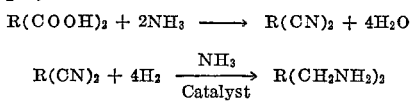

The polymeric fat acids, useful in preparing the starting materials for my process, are prepared by polymerizing a fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize, but polymerization can be obtained at elevated temperatures with a peroxidic reagent such as di-t-butyl peroxide. Because of the low yields of polymeric products, these materials are not commercially significant. Suitable saturated fat acids include branched and straight chain acids such as caprylic acid, pelargonic acid, capric acid, lauric acid, myristic acid, palmitic aicd, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable agents for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

Acetylenically unsaturated fat acids, such as isanic and isanolic acids, can also be polymerized to give polymeric acids which can be used. The acetylenically unsaturated acids occur only rarely in nature and are expensive to synthesize. Therefore, they are not currently of commercial significance.

Although any one of the above-described saturated, ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying and semi-drying oils include soybean, linseed, tall, tung, perilla, oiticia, cottonseed, corn, sunflower, dehydrated castor oil and the like. Also, the most readily available acids are oleic and linoleic and thus they are preferred starting materials for the preparation of the polymeric fat acids. It is preferred to employ as starting materials in the preparation of the polyamines, relatively pure dimerized fat acids. Such acids can be obtained from mixtures containing monomer, the dimerized fat acids, trimerized fat acids and higher polymers by high vacuum distillation or solvent extraction. The use of relatively pure dimerized fat acids in the preparation of the polyamine starting materials is advantageous where a diisocyanate is to be prepared by my process for use as a monomer in the preparation of linear high molecular weight polymers. Any of the described unsaturated polymeric fat acids can be hydrogenated prior to the use thereof in preparing the polyamines. The preferred polyamine starting materials thus have the formula:

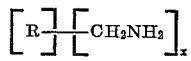

where R and $x$ have the meanings set forth hereinabove.

Other polyamines can also be used as starting materials for preparing polyisocyanates according to the instant process. Representative of such polyamines is hexadecyldiamine—i.e.

More generally, my process is useful for preparing non-aromatic polyisocyanates from the above-described polyamines derived from polymeric fat acids and aliphatic polyamines of the formula:

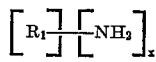

where $x$ is 2 to about 4 and $R_1$ is an aliphatic group, preferably an aliphatic hydrocarbon group containing at least about 16 carbon atoms.

Salts of the described polyamines can also be employed as starting materials in my process. Preferred salts are the halide salts and particularly the hydrochloric salts.

The reaction of the phosgene with the polyamine or salt thereof is carried out in an inert, water-immiscible solvent or diluent. By inert is meant that the solvent or diluent will not react with the polyamine, phosgene, hydrogen halide or the formed polyisocyanates. Representative inert, water-immiscible solvents are chlorobenzene, O-dichlorobenzene, toluene, benzene, xylene, kerosene, cyclohexane and the like.

At least one equivalent of phosgene is used for each equivalent of amine or salt. Thus where a diisocyanate is to be prepared, one mole of diamine or salt will be reacted with two moles of phosgene. It is preferred to use an excess of the phosgene. The solvent is used in an amount sufficient to dissolve the starting polyamine or salt and the resulting polyisocyanate. Preferably the solvent is employed in amounts of from 50 to 1000% by weight based on the weight of the polyamine or salt and the phosgene starting materials. The reaction of the phosgene with the polyamine or salt thereof is preferably carried out at atmospheric pressure and from ambient room temperatures (i.e. 25° C.) to the boiling point of the solvent. The formed carbamyl chloride is generally converted to the polyisocyanate to the extent possible in the one-step operation by raising the temperature to a point high enough to effect decomposition thereof.

After the above-described reactions have been completed, the reaction mixture is treated according to the present invention with an aqueous solution of a weak base. Representative water soluble weak bases are the bicarbonates, carbonates, acetates, citrates and borates of the alkali metals such as sodium bicarbonate, sodium carbonate, potassium bicarbonate, potassium carbonate, lithium bicarbonate, lithium carbonate, sodium acetate, potassium acetate, lithium acetate, sodium citrate, potassium citrate, lithium citrate, sodium borate and the like and amines such as diethylamine, triethylamine, tetramethyl ethylene diamine, other water soluble tertiary amines, and the like. The alkali metal bicarbonates are preferred. An especially preferred weak base is sodium bicarbonate. Dilute solutions, about 2–15% by weight, of the weak base in water are preferred. The said solutions are used in an amount sufficient to effect substantially complete removal of hydrogen chloride from the reaction mixture and to effect substantially complete conversion of carbamyl chloride to the corresponding polyisocyanate. Generally, the reaction mixture with or without partial removal of the solvent or diluent, is contacted with about equal volumes of an aqueous solution of the weak base. The treatment is repeated, if necessary, until the aqueous solution, after the contacting step, remains basic. This indicates that substantially complete removal of the hydrogen chloride has been effected.

After separation of the organic phase from the aqueous treating solution, it is preferably washed with about equal volumes of an aqueous solution of sodium chloride (about 2–15% by weight concentration) until the washings become neutral. The organic phase is then preferably dried and the solvent removed by evaporation, distillation or the like. The resulting product can then be distilled to produce a substantially pure polyisocyanate.

The following example serves to illustrate the invention without limiting it thereto.

Example

To a 12 liter flask equipped with an agitator, a condenser with a cooling medium maintained below 0° C., a nitrogen inlet, a thermometer and an addition funnel were charged 2,100 grams of phosgene in 5,000 ml. of dry toluene. The flask was heated until the temperature of the phosgene solution reached 20° C. The heating source was then removed and a solution of 1438 grams of dimer diamine in 1000 ml. of dry toluene was added slowly through the addition funnel over a one hour period during which period the reaction temperature rose to 45° C. The dimer diamine was prepared by hydrogenating a dimer dinitrile in the presence of ammonia and methanol-wet Raney nickel catalyst. The dimer dinitrile was prepared from a dimerized fat acid derived from the mixture of acids in tall oil which acid consisted mainly of dimerized linoleic and oleic acids. The dimer diamine had a total amine number of 208.8.

After the addition was complete, the heating of the flask was resumed at a slow rate to maintain gentle reflux while avoiding any excessive gas evolution. The cooling medium in the condenser was exchanged with tap water two hours after the resumption of heating. After six hours the temperature of the reaction mixture in the flask reached 110° C. at which time the condenser was replaced by a distillation head. A total of four liters of the toluene solvent were removed by distillation. The reaction mixture was then cooled to 20° C. and washed with equal volumes of an 8% by weight aqueous solution of sodium bicarbonate until the aqueous solution, after contact with the organic phase, remained basic to litmus. The organic phase was separated from the aqueous treating phase, washed with a 10% by weight aqueous solution of sodium chloride until essentially neutral and dried over anhydrous sodium sulfate. After completion of the dehydration, the remaining toluene solvent was removed by distillation under reduced pressure to yield a residue weighing 1521 grams (98.5% yield). The diisocyanate product was then distilled in a wiped-film still at an outside jacket temperature of 270° C. and a pressure of 70 microns to yield 1200 grams of substantially pure dimer diisocyanate which had an HCl content of only 0.03% by weight.

The embodiments of the invention in which an exclusive property or privilege is claimed are defined as follows:

1. In the process of preparing polyisocyanates wherein phosgene is reacted with an amine compound in an inert, water-immiscible organic solvent to form the corresponding carbamyl chloride and the carbamyl chloride is decomposed to the polyisocyanates, the said amine compound being selected from the group consisting of amines of the formulae (1) 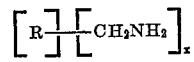

and (2) 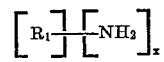

where R is the hydrocarbon radical of polymeric fat acids, said polymeric fat acids having been prepared by polymerizing monobasic, aliphatic, carboxylic acids of 8 to 24 carbon atoms, $R_1$ is an aliphatic radical of at least 16 carbon atoms and $x$ is an integer of 2 to about 4, and the hydrohalide salts of such amines, the improvement comprising washing the polyisocyanate containing reaction medium with about a 2 to 15% by weight aqueous solution of a water soluble weak base to effect substantially complete removal of hydrogen chloride from the reaction medium and to effect substantially complete conversion of the carbamyl chloride to the corresponding polyisocyanate, said aqueous solution being used in an amount sufficient to effect such removal and such conversion, said washing being repeated, if necessary, until the aqueous solution is basic after separation from the reaction medium, and said water soluble weak base being selected from the group consisting of the bicarbonates, carbonates, acetates, citrates and borates of the alkali metals.

2. The process of claim 1 where $x$ is 2 and the amine compound has the formula 1.

3. The process of claim 1 wherein the water soluble weak base is sodium bicarbonate.

4. The process of claim 1 wherein the washed reaction medium is separated from the aqueous solution of the water soluble weak base and the inert, water-immiscible organic solvent is removed to yield the polyisocyanate.

(References on following page)

References Cited

UNITED STATES PATENTS

| | | | |
|---|---|---|---|
| 2,326,501 | 8/1943 | Siefken et al. | 260—453 |
| 2,640,068 | 5/1953 | Schaefer et al. | 260—453 |
| 2,727,020 | 12/1955 | Melamed et al. | 260—453 XR |
| 2,865,940 | 12/1958 | Nobis et al. | 260—453 |
| 3,179,680 | 4/1965 | Kober | 260—453 |
| 3,311,654 | 3/1967 | Sayigh et al. | 260—453 |

DOLPH H. TORRENCE, Primary Examiner

U.S. Cl. X.R.

260—75, 77.5, 407, 409, 413, 465.2, 465.8, 583